US011034453B1

(12) United States Patent
Malecha et al.

(10) Patent No.: US 11,034,453 B1
(45) Date of Patent: Jun. 15, 2021

(54) BEZEL-MOUNTED SEAT PRIVACY CLOSEOUT

(71) Applicant: B/E Aerospace, Inc., Winston-Salem, NC (US)

(72) Inventors: Jeremy F. Malecha, Pfafftown, NC (US); Jason Owen, Stokesdale, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 16/666,953

(22) Filed: Oct. 29, 2019

(51) Int. Cl.
*B64D 11/06* (2006.01)

(52) U.S. Cl.
CPC ...... *B64D 11/0606* (2014.12); *B64D 11/0627* (2014.12); *B64D 11/0636* (2014.12)

(58) Field of Classification Search
CPC ............ B64D 11/0606; B64D 11/0636; B64D 11/0627; B64D 11/0023; B64D 11/0602; B64D 11/0638; B60N 2/757
USPC .................................................... 297/188.04
See application file for complete search history.

(56) References Cited

U.S. PATENT DOCUMENTS

| | | | |
|---|---|---|---|
| 4,440,443 A | 4/1984 | Nordskog | |
| 6,457,772 B1 * | 10/2002 | Forston | A47C 7/62 297/188.04 |
| 6,644,736 B2 | 11/2003 | Nguyen et al. | |
| 7,469,968 B2 | 12/2008 | Hazlewood | |
| 7,568,759 B2 | 8/2009 | Schurg | |
| 9,216,665 B2 * | 12/2015 | Herault | B64D 11/0641 |
| 9,834,308 B2 | 12/2017 | Henshaw et al. | |
| 10,384,579 B1 | 8/2019 | Wanner et al. | |
| 10,479,506 B1 * | 11/2019 | Colletti | B64D 11/0606 |
| 2009/0134688 A1 | 5/2009 | Waltman et al. | |
| 2015/0274299 A1 | 10/2015 | Henshaw et al. | |
| 2015/0321592 A1 * | 11/2015 | De Morais | A47B 5/006 297/147 |

(Continued)

FOREIGN PATENT DOCUMENTS

| | | |
|---|---|---|
| DE | 102004061471 | 9/2007 |
| EP | 1187739 A1 | 3/2002 |

(Continued)

OTHER PUBLICATIONS

Extended Search Report for European Application No. 20204767.6 dated Mar. 16, 2021, 8 pages.

*Primary Examiner* — Milton Nelson, Jr.
(74) *Attorney, Agent, or Firm* — Suiter Swantz pc llo

(57) ABSTRACT

An aircraft passenger seat assembly is disclosed. In embodiments, the aircraft passenger seat assembly includes an aircraft passenger seat, wherein the aircraft passenger seat includes a seatback configured to support an upper body of an aircraft passenger, and a seatback bezel defining at least a portion of a rear seatback surface. In embodiments, the aircraft passenger seat assembly may further include at least one privacy assembly, wherein the at least one privacy assembly includes a closeout body coupled to the seatback bezel, and a privacy panel coupled to the closeout body, the privacy panel extending from the closeout body in order to at least partially separate a seating environment of the aircraft passenger seat from an adjacent seating environment of an adjacent aircraft passenger seat.

19 Claims, 15 Drawing Sheets

(56) References Cited

U.S. PATENT DOCUMENTS

| | | | | |
|---|---|---|---|---|
| 2016/0152169 A1* | 6/2016 | Zheng | ................... | B60R 11/00 |
| | | | | 297/163 |
| 2017/0015420 A1 | 1/2017 | Henshaw et al. | | |
| 2019/0061955 A1* | 2/2019 | Wilson | ................... | B60N 2/879 |

FOREIGN PATENT DOCUMENTS

| | | | | |
|---|---|---|---|---|
| EP | 1584553 A3 | 9/2013 | | |
| EP | 3309072 A1 | 4/2018 | | |
| WO | WO-2020039236 A1 * | 2/2020 | ......... | B64D 11/0642 |

* cited by examiner

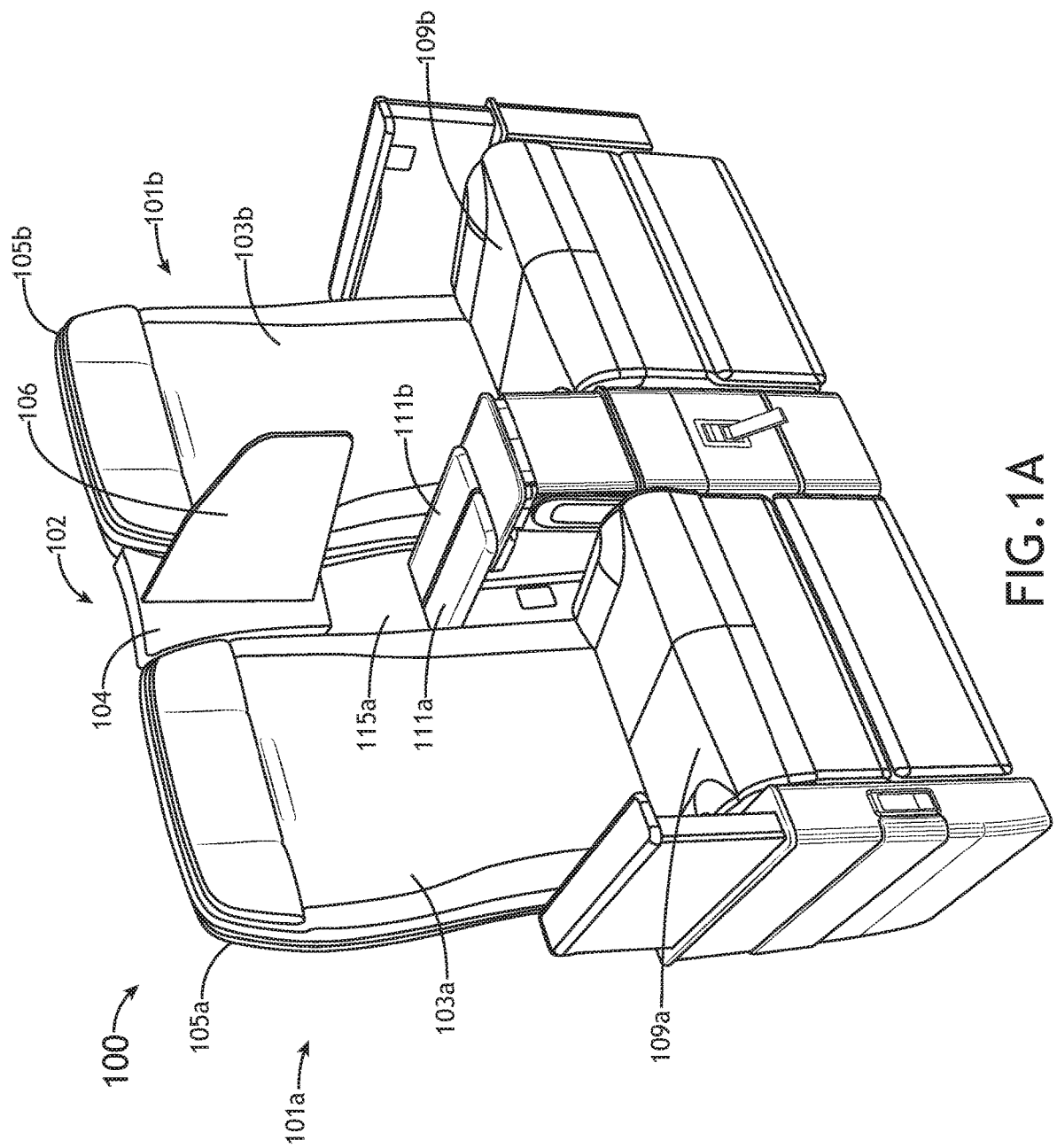

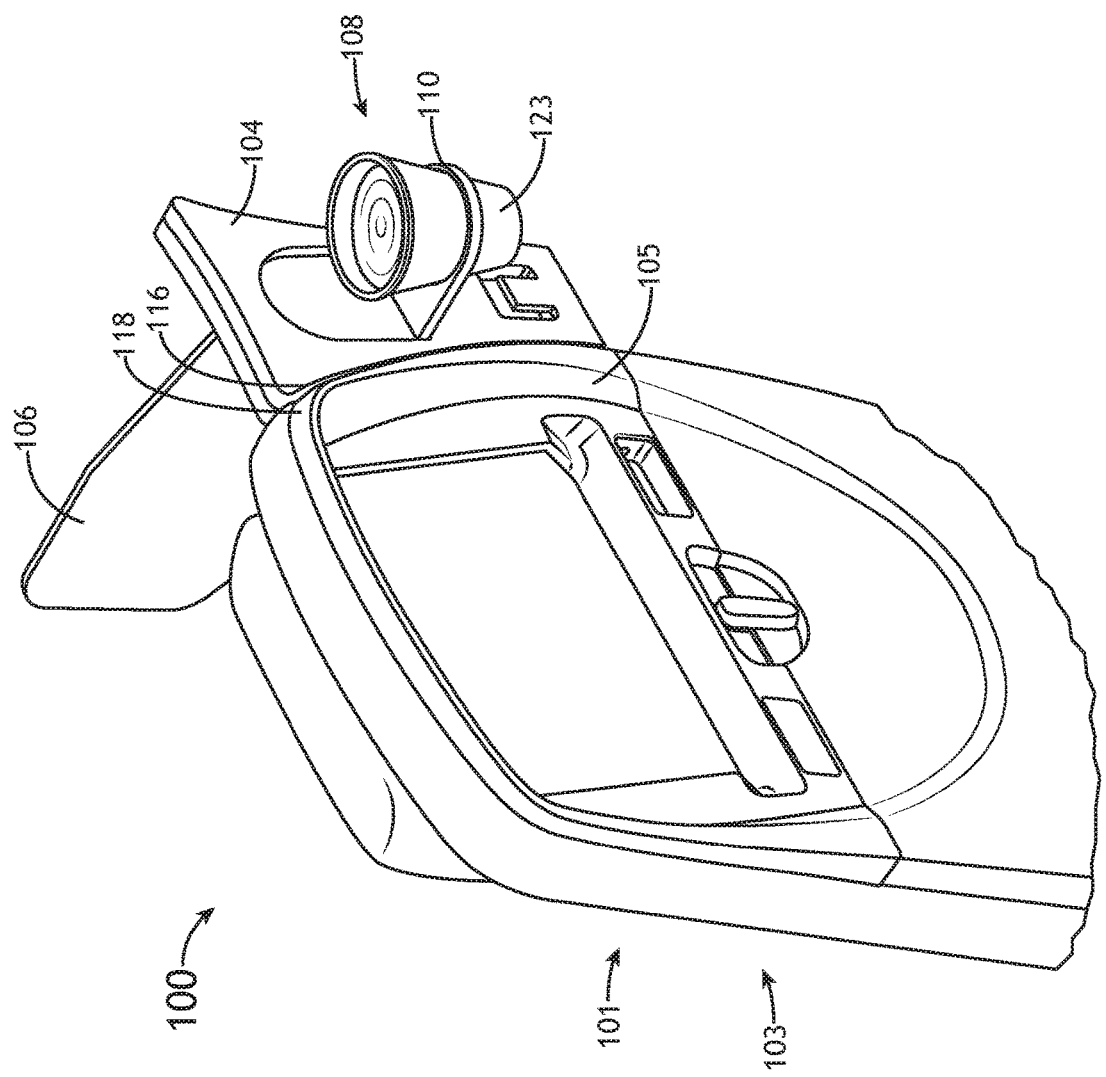

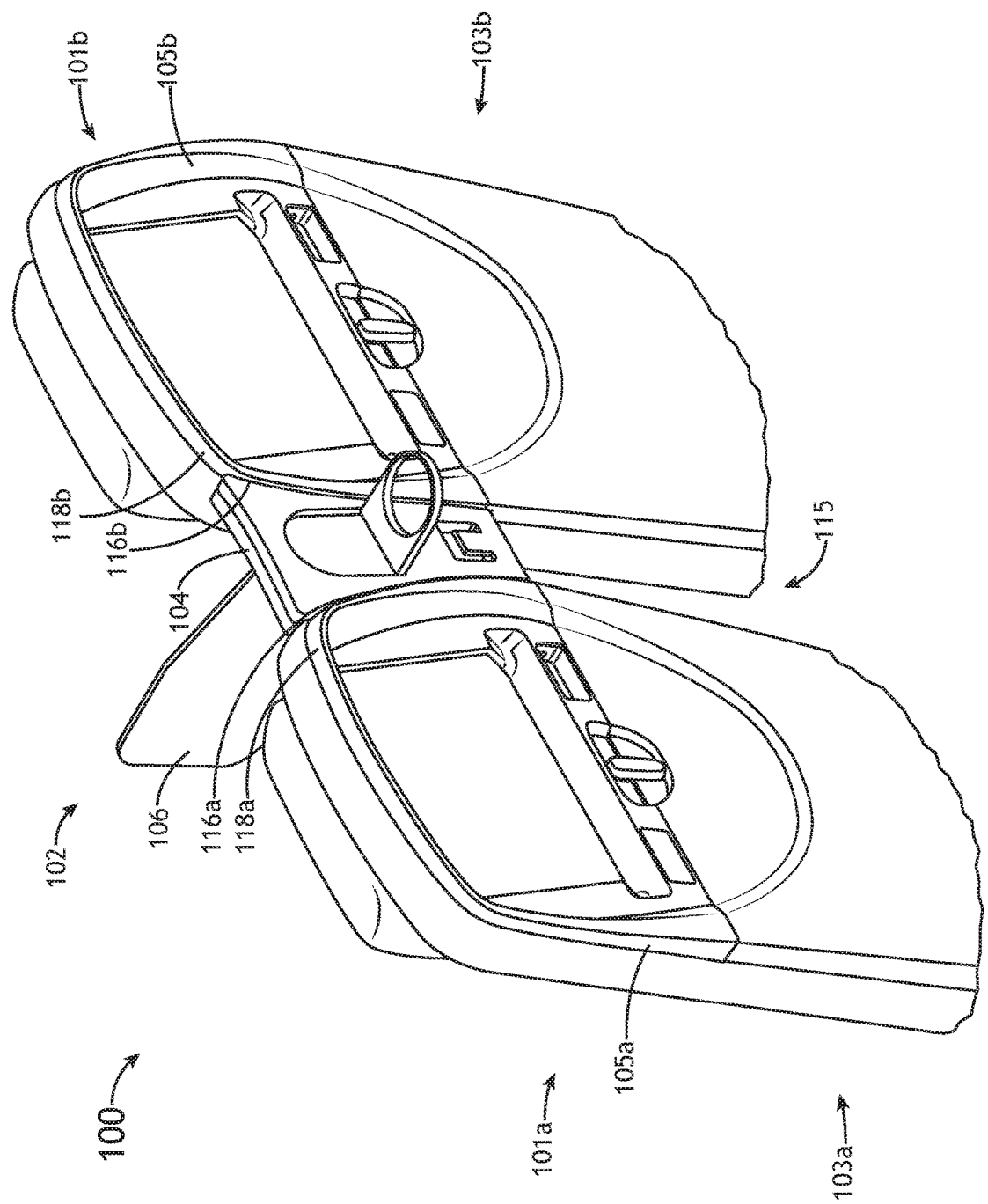

BEZEL-MOUNTED SEAT PRIVACY CLOSEOUT

BACKGROUND

In traditional aircraft settings, there is generally a lack of privacy between passengers in economy seating. Added privacy and other amenities are usually not provided until a premium economy seating class. Additionally, traditional aircraft seating does not provide sufficient stowage opportunities for personal items, such as beverages, bags, headphones, and the like. Therefore, there exists a need in the art which address one or more of the shortfalls of previous approaches identified above.

SUMMARY

An aircraft passenger seat assembly is disclosed. In embodiments, the aircraft passenger seat assembly includes an aircraft passenger seat, wherein the aircraft passenger seat includes a seatback configured to support an upper body of an aircraft passenger, and a seatback bezel defining at least a portion of a rear seatback surface. In embodiments, the aircraft passenger seat assembly may further include at least one privacy assembly, wherein the at least one privacy assembly includes a closeout body coupled to the seatback bezel, and a privacy panel coupled to the closeout body, the privacy panel extending from the closeout body in order to at least partially separate a seating environment of the aircraft passenger seat from an adjacent seating environment of an adjacent aircraft passenger seat.

In some embodiments of the aircraft passenger seat assembly, the closeout body is configured to substantially fill a gap between the seatback bezel of the aircraft passenger seat and an adjacent seatback bezel of an adjacent aircraft passenger seat.

In some embodiments of the aircraft passenger seat assembly, the closeout body includes a first contoured edge conforming to a lateral surface of the seatback bezel of the aircraft passenger seat, and a second contoured edge conforming to a lateral surface of the adjacent seatback bezel of the adjacent aircraft passenger seat.

In some embodiments of the aircraft passenger seat assembly, the seatback bezel and the closeout body are fabricated as a single seatback bezel assembly.

In some embodiments of the aircraft passenger seat assembly, the closeout body is coupled to the seatback bezel by at least one of a mechanical fastener or a solvent bonding.

In some embodiments of the aircraft passenger seat assembly, the closeout body is formed by at least one of a thermoforming process or an injection molding process.

In some embodiments of the aircraft passenger seat assembly, the at least one privacy assembly includes a first privacy assembly coupled to a first lateral surface of the seatback bezel, and a second privacy assembly coupled to a second lateral surface of the seatback bezel opposite the first surface.

In some embodiments of the aircraft passenger seat assembly, the closeout body includes a rear closeout body surface proximate to the rear seatback surface.

In some embodiments of the aircraft passenger seat assembly, the rear closeout body surface includes one or more cupholder assemblies disposed on the rear closeout body surface.

In some embodiments of the aircraft passenger seat assembly, the one or more cupholder assemblies include a support structure pivotably coupled to the rear closeout body surface.

In some embodiments of the aircraft passenger seat assembly, wherein the rear closeout body surface includes one or more storage structures.

In some embodiments of the aircraft passenger seat assembly, the one or more storage structures include at least one of a hook, a clip, a bracket, or a mobile device stowage assembly.

In some embodiments of the aircraft passenger seat assembly, the privacy panel is removably coupled to the closeout body.

In some embodiments of the aircraft passenger seat assembly, the privacy panel includes a retractable privacy panel configured to extend and retract along at least one movement axis.

An aircraft passenger seat privacy assembly is disclosed. In embodiments, the aircraft passenger seat privacy assembly includes a closeout body coupled to a seatback bezel of an aircraft passenger seat, wherein the closeout body is configured to at least partially fill a gap between the seatback bezel of the aircraft passenger seat and an adjacent seatback bezel of an adjacent passenger seat. In embodiments, the aircraft passenger seat privacy assembly may further include a privacy panel coupled to the closeout body, the privacy panel extending from the closeout body proximate to a front seatback surface of the aircraft passenger seat in order to at least partially separate a seating environment of the aircraft passenger seat from an adjacent seating environment of the adjacent aircraft passenger seat.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1A illustrates a front perspective view of an aircraft passenger seat assembly, in accordance with one or more embodiments of the present disclosure.

FIG. 2B illustrates a rear perspective view of an aircraft passenger seat assembly, in accordance with one or more embodiments of the present disclosure.

FIG. 2C illustrates a rear perspective view of an aircraft passenger seat assembly, in accordance with one or more embodiments of the present disclosure.

DETAILED DESCRIPTION

Figure 1B:
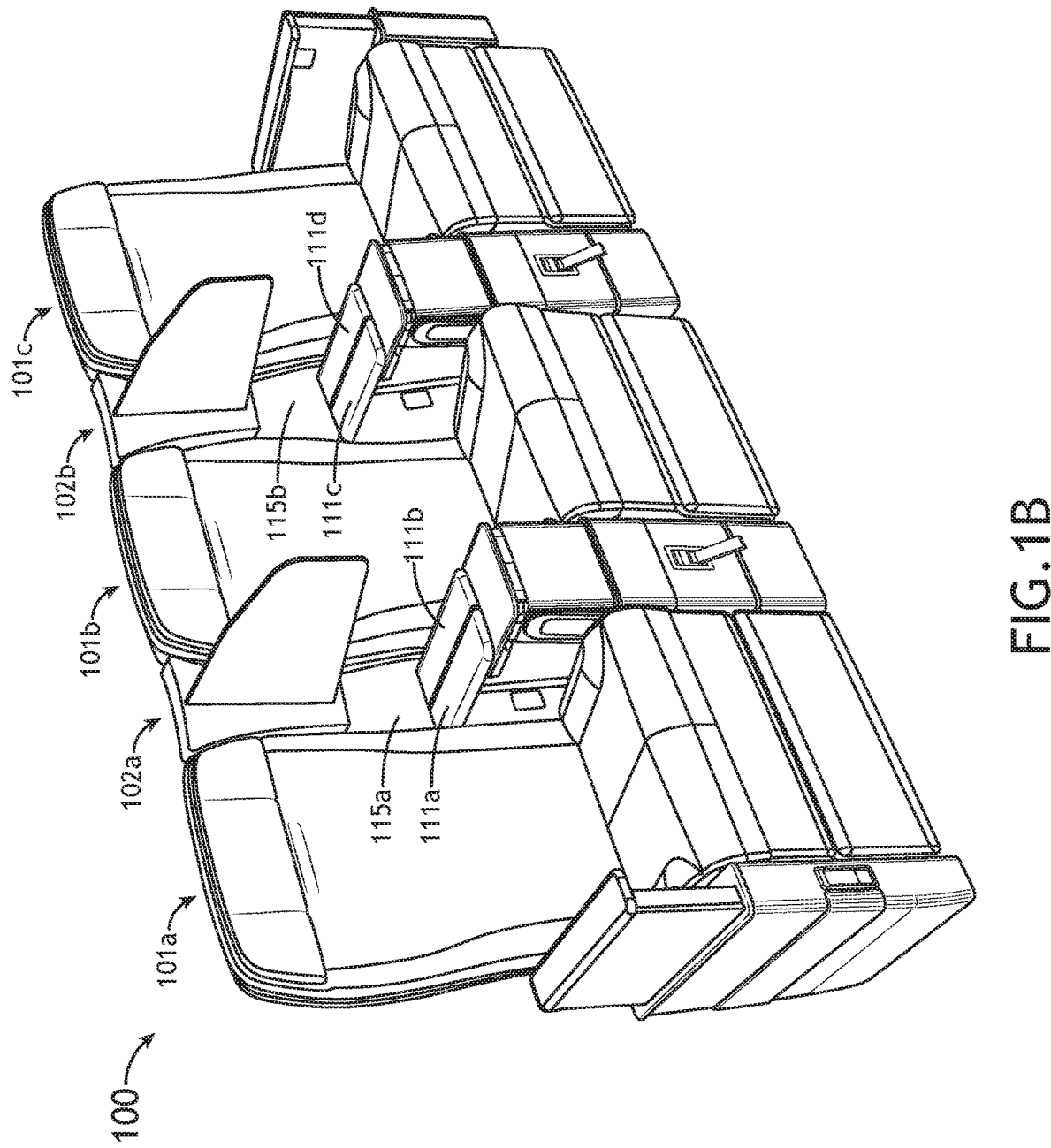
FIG. 1B illustrates a front perspective view of an aircraft passenger seat assembly, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

In traditional aircraft settings, there is generally a lack of privacy between passengers in economy seating. Added privacy and other amenities are usually not provided until a premium economy seating class. Additionally, traditional aircraft seating does not provide sufficient stowage opportunities for personal items, such as beverages, bags, headphones, and the like.

Accordingly, embodiments of the present disclosure are directed to an aircraft passenger seat assembly which cure one or more of the shortfalls of previous approaches identified above. Embodiments of the present disclosure are directed to a privacy assembly for an aircraft passenger seat assembly, the privacy assembly including a closeout body and a privacy panel. Privacy panels of the present disclosure may provide separation between adjacent aircraft seats and aircraft passengers. Additional embodiments of the present disclosure are directed to a closeout body of a privacy assembly configured to fill gaps/spaces between adjacent aircraft seats. Further embodiments of the present disclosure are directed to cupholder assemblies and other storage structures disposed within the closeout bodies.

It is contemplated herein that the aircraft passenger seat assembly may provide improved privacy between passengers seated in adjacent aircraft passenger seats. Improved privacy may be particularly beneficial in the context of regular economy seats. It is further contemplated herein that privacy assemblies including closeout bodies may enable additional storage structures for personal items, such as cups, beverages, bags, headphones, and the like.

Reference will now be made in detail to the subject matter disclosed, which is illustrated in the accompanying drawings.

FIG. 1A illustrates a front perspective view of an aircraft passenger seat assembly 100, in accordance with one or more embodiments of the present disclosure. The aircraft passenger seat assembly 100 may include, but is not limited to, an aircraft passenger seat 101a, 101b and a privacy assembly 102. The privacy assembly 102 may include, but is not limited to, a closeout body 104 and a privacy panel 106.

In many aircraft settings, aircraft passenger seats 101a, 101b are arranged in rows, as shown in FIG. 1A. For example, a first aircraft passenger seat 101a may be positioned adjacent to a second aircraft passenger seat 101b. In embodiments, an aircraft passenger seat 101a, 101b may include a seatback 103a, 103b configured to support an upper body of an aircraft passenger, and a seat structure 109a, 109b upon which the aircraft passenger may be seated. The aircraft passenger seat 101a, 101b may further include armrests 111a, 111b on lateral sides of each aircraft passenger seat 101a, 101b. The armrests 111a, 111b may be configured to separate adjacent aircraft seats 101a, 101b, as well as separate aircraft seats 101a, 101b from an aisle or an outer wall of the aircraft.

Generally speaking, each aircraft passenger seat 101a, 101b may include a "seating environment" within which a passenger is seated, wherein the seating environment is approximately defined by the seatback 103a, 103b, seat structure 109a, 109b, and the armrests 111a, 111b. In embodiments, the seatback 103a, 103b of an aircraft passenger seat 101a, 101b may include a front seatback surface to support an upper body of a passenger, and a rear seatback surface which faces towards a passenger seated directly behind each respective aircraft passenger seat 101a, 101b. As will be noted in further detail herein, the rear seatback surface may include a seatback bezel 105a, 105b, a display monitor (e.g., TV), a tray table, and the like. The seatback bezel 105a, 105b may define at least a portion of the rear seatback surface of the seatback 103a, 103b. In embodiments, the seatback bezel 105 may include a display monitor bezel configured to at least partially surround a display monitor or other device disposed within the rear seatback surface of the seatback 103.

In embodiments, the aircraft passenger seat assembly 100 may further include one or more privacy assemblies 102 coupled to at least one aircraft passenger seat 101. For example, as shown in FIG. 1A, the aircraft passenger seat assembly 100 may include a privacy assembly 102 coupled to the first aircraft passenger seat 101a and/or the second aircraft passenger seat 101b. In embodiments, the privacy assembly 102 may be coupled to the seatback bezel 105 of the respective aircraft passenger seat 101. In embodiments, the privacy assembly 102 includes a closeout body 104 and one or more privacy panels 106. The closeout body 104 may be coupled to the seatback bezel 105 of an aircraft passenger seat 101 in order to at least partially fill a gap 115a between aircraft passenger seats 101.

For example, as shown in FIG. 1B, a row of seats in an aircraft may include a first aircraft passenger seat 101a, a second aircraft passenger seat 101b, and a third aircraft passenger seat 101c. In this example, the second aircraft passenger seat 101b (e.g., middle aircraft passenger seat 101b) may include a first privacy assembly 102a coupled to a first lateral surface of the seatback bezel 105b of the aircraft passenger seat 101b, and a second privacy assembly 102b coupled to a second lateral surface of the seatback bezel 105b opposite the first surface. It is noted herein that coupling each of the first privacy assembly 102a and the second privacy assembly 102b to the second aircraft passenger seat 101b (e.g., middle aircraft passenger seat 101b) may enable the respective privacy assemblies 102a, 102b to actuate along with the second aircraft passenger seat 101b as the seat is reclined backwards and forwards.

In embodiments, as shown in FIGS. 1A-1B, the closeout body 104 of the respective privacy assembly 102 may be configured to at least partially fill a gap 115 between the seatback bezels 105a, 105b of adjacent seatbacks 103a, 103b. For example, as shown in FIG. 1A, the closeout body 104 may be configured to substantially fill a gap 115 between the seatback bezel 105a of the first seatback 103a and the seatback bezel 105b of the second seatback 103b.

In additional and/or alternative embodiments, the privacy assembly 102 may include one or more additional privacy components configured to further close, occlude, and/or fill a gap 115 between adjacent seatbacks 103a, 103b. For example, as shown in FIG. 1A, the privacy assembly 102 may include one or more additional privacy components coupled to the closeout body 104, wherein the one or more additional privacy components are configured to extend downwards from the closeout body 104 in order to fill/block a larger portion of the gap 115a between seatbacks 103a, 103b. Additional privacy components may include, but are not limited to, fabric "curtains" or "flaps," extensions of a dress cover, other hard plastic or metal bodies, and the like. For instance, the privacy assembly 102 may further include a portion of a dress cover coupled to the closeout body 104, wherein the dress cover is configured to extend down from the closeout body 104 in order to at least partially fill the remainder of the gap 115a.

It is noted herein that additional privacy components (e.g., dress covers, curtains) of the privacy assembly 102 may be coupled to the closeout body 104 in such a manner so as to not interfere with the actuation of the armrests 111a, 111b. For example, in the context of a dress cover extending from the closeout body 104, the dress cover may be coupled to the closeout body 104 such that it drapes substantially parallel to the rear seatback surfaces of the seatbacks 103a, 103b, and may therefore not interfere with the actuation of the armrests 111a, 111b.

In embodiments, the one or more privacy panels 106 of the privacy assembly 102 are configured to extend from the closeout body 104 in order to at least partially separate seating environments of adjacent aircraft passenger seats 101a, 101b. For example, as shown in FIG. 1A, the privacy panel 106 may extend from the closeout body 104 proximate to the front seatback surfaces of the first seatback 103a and the second seatback 103b. In this example, the privacy panel 106 partially separates the first seating environment of the first aircraft passenger seat 101a and the second seating environment of the second aircraft passenger seat 101b. By separating adjacent seating environments, the privacy assembly 102 of the present disclosure may provide improved privacy for aircraft passengers seated adjacent to one another. Additionally, it is contemplated herein that the one or more privacy panels 106 may provide additional surfaces for aircraft passengers to rest their head, neck, and shoulders, thereby enhancing passenger comfort and overall flying experience.

Figure 2A:
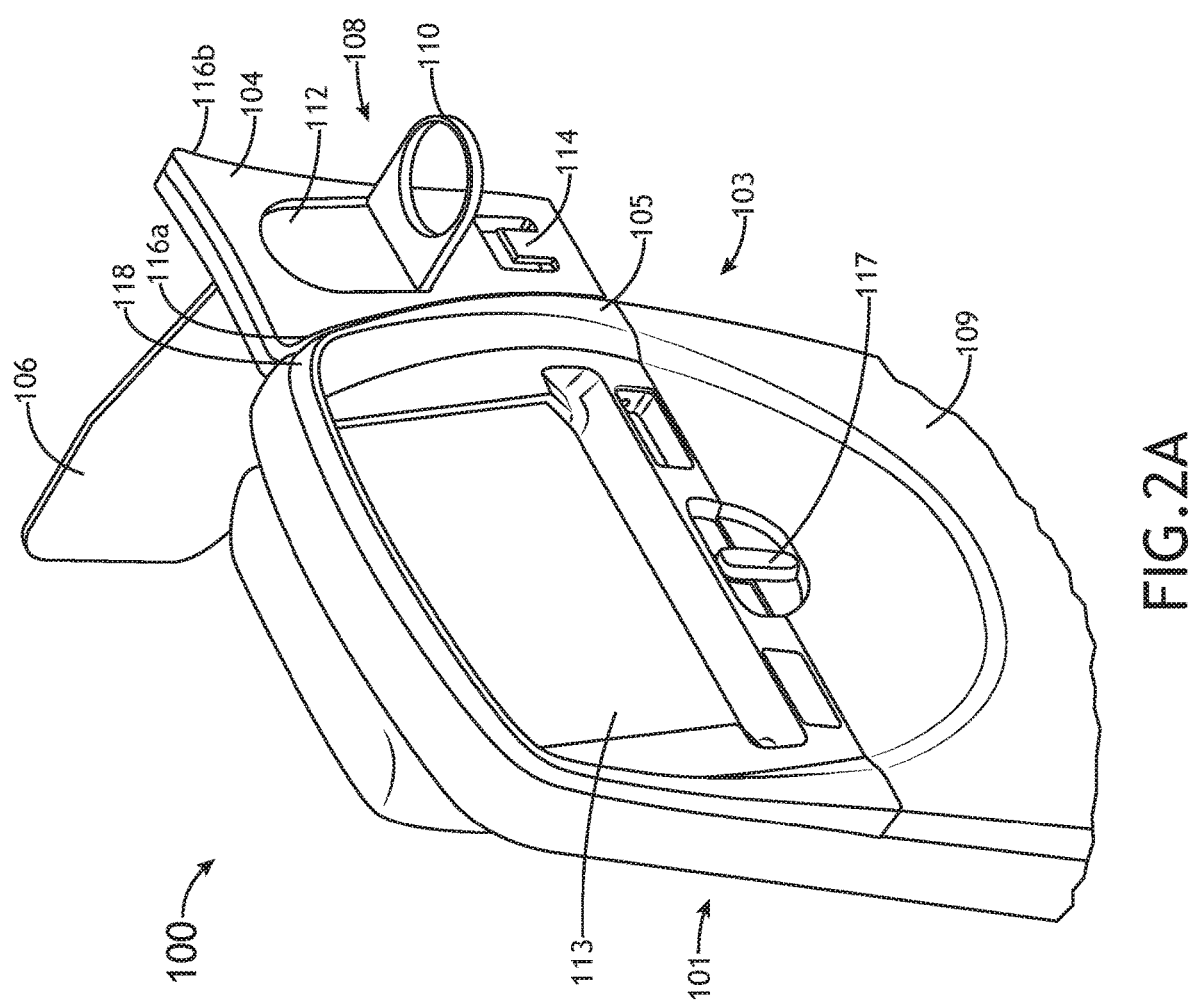
FIG. 2A illustrates a rear perspective view of an aircraft passenger seat assembly, in accordance with one or more embodiments of the present disclosure.

FIG. 2A illustrates a rear perspective view of an aircraft passenger seat assembly 100, in accordance with one or more embodiments of the present disclosure. FIG. 2B illustrates a rear perspective view of an aircraft passenger seat assembly 100, in accordance with one or more embodiments of the present disclosure.

As shown in FIG. 2A, a rear seatback surface of the seatback 103 may include, but is not limited to, a seatback bezel 105, a display monitor 113, and a tray table 109. In embodiments with a display monitor 113, the seatback bezel 105 may include a display monitor bezel 105 configured to at least partially surround the display monitor 113. The seatback bezel 105 may be fabricated from any material known in the art including, but not limited to, plastics, metals, and the like. The seatback bezel 105 may include a tray table locking assembly 113 disposed within the seatback bezel 105, wherein the tray table locking assembly 113 is configured to be actuated in order to lock the tray table 109 in a "closed" position, and release the tray table 109 into an "open" position.

The closeout body 104 and/or privacy panel 106 of the privacy assembly 102 may be fabricated via any fabrication techniques known in the art including, but not limited to, thermoforming processes, injection molding processes, and the like. Similarly, components of the privacy assembly 102 may be fabricated from any material known in the art including, but not limited to, plastic materials, metal materials, and the like. In embodiments, the closeout body 104 of the privacy assembly 102 may be coupled to the seatback bezel 105 using any techniques known in the art. For example, the closeout body 104 may be coupled to the seatback bezel 105 by one or more mechanical fasteners including, but not limited to, rivets, bolts, and the like. By way of another example, the closeout body 104 may be coupled to the seatback bezel 105 via one or more adhesives or solvent bonding processes.

In additional and/or alternative embodiments, the seatback bezel 105 may be fabricated to include one or more privacy assemblies 102 such that the seatback bezel 105 and a closeout body 104 of a privacy assembly 102 is fabricated as a single seatback bezel assembly. For example, as shown in FIG. 2A, the seatback bezel 105 and the closeout body 104 of the privacy assembly 102 may be fabricated via one or more thermoforming processes or one or more injection molding processes as a single seatback bezel assembly. It is noted herein that forming the seatback bezel 105 and the privacy assembly 102 (e.g., closeout body 104) as a single seatback bezel assembly may provide additional structural rigidity and strength, as well as reduce the weight of the aircraft passenger seat assembly 100.

In embodiments, the closeout body 104 may include a rear closeout body surface proximate to the rear seatback surface of the seatback 103. In some embodiments, the rear closeout body surface of the closeout body 104 may include one or more structures configured to hold/store personal items of aircraft passengers. For example, as shown in FIGS. 2A-2B, the rear closeout body surface may include one or more cupholder assemblies 108 disposed on and/or within the rear closeout body surface. The one or more cupholder assemblies 108 may be configured to hold/store a cup 123 or another beverage container.

In some embodiments, the cupholder assembly 108 may include an actuatable cupholder assembly 108. In this regard, the cupholder assembly 108 may be configured to be actuated between an "inactive" or "stowed" position and an "active" position, as shown in FIGS. 2A-2B. For example, the cupholder assembly 108 may include a support structure 110 configured to support/receive a cup 123, wherein the support structure 110 is pivotably coupled to the rear closeout body surface of the closeout body 104. The support structure 110 may be pivotably coupled to the rear closeout body surface using any technique known in the art including, but not limited to, one or more hinges, a pivotable tab/detent assembly, and the like. In some embodiments, the support structure 110 may be disposed within one or more recesses 112 within the rear closeout body surface when in the "stowed" or "inactive" position.

In embodiments, the rear closeout body surface of the closeout body 104 may further include one or more storage structures 114. For example, as shown in FIGS. 2A-2B, the rear closeout body surface may include a storage structure 114 configured to store, hold, or otherwise receive personal items of an aircraft passenger. The one or more storage structures 114 may include any storage structures known in the art including, but not limited to, a hook, a clip, a bracket, a mobile device stowage assembly (e.g., phone holder, phone docking station), and the like. For instance, as shown in FIG. 2A, the storage structure 114 may include a "U" bracket configured to store/hold items such as personal bags (e.g., purses, backpacks), trash bags, headphones, and the like.

FIG. 2C illustrates a rear perspective view of an aircraft passenger seat assembly 100, in accordance with one or more embodiments of the present disclosure.

In embodiments, the closeout body 104 may be shaped to conform or substantially conform to seatback bezels 105. For example, in some embodiments, the closeout body 104 may include a first contoured edge 116a conforming to a lateral surface 118 of the seatback bezel 105 of the seatback 103. Similarly, the closeout body 104 may include a second contoured edge 116b conforming to a lateral surface 118b of an adjacent seatback bezel 105b of an adjacent seatback 103b. With contoured edges 116a, 116b configured to conform, or substantially conform, to lateral surfaces 118a, 118b of seatback bezels 105a, 105b, the closeout body may be configured to fill, or substantially fill, gaps 115 between adjacent seatbacks 103 (e.g., gaps 115 between adjacent seatback bezels 105).

In some embodiments, the closeout body 105 of the privacy assembly 102 may be shaped and sized in order to avoid interfering with the operation of the armrests 111. For example, it is noted herein that armrests 111 of traditional aircraft passenger seats 101 may be pivotably coupled to the seatback 103, such that they may be pivoted up into a "stowed" position parallel to the seatback 103, and pivoted down into an "active' position perpendicular, or substantially perpendicular, to the seatback 103. In this regard, the closeout body 105 may be configured to substantially fill an upper portion of the gap 115 between adjacent aircraft passenger seats 101, but preserve a lower portion of the gap 115 which may receive the armrests 111 when they are actuated into the stowed position alongside the seatbacks 10a, 103b. For instance, in some embodiments, as shown in FIG. 2C, the closeout body 104 may be configured to substantially fill the gap 115 between the first seatback bezel 105a and the second seatback bezel 105b, but not fill the gap 115 between lower portions of the seatbacks 103a, 103b, such as between the tray tables 113a, 113b.

Figure 3:
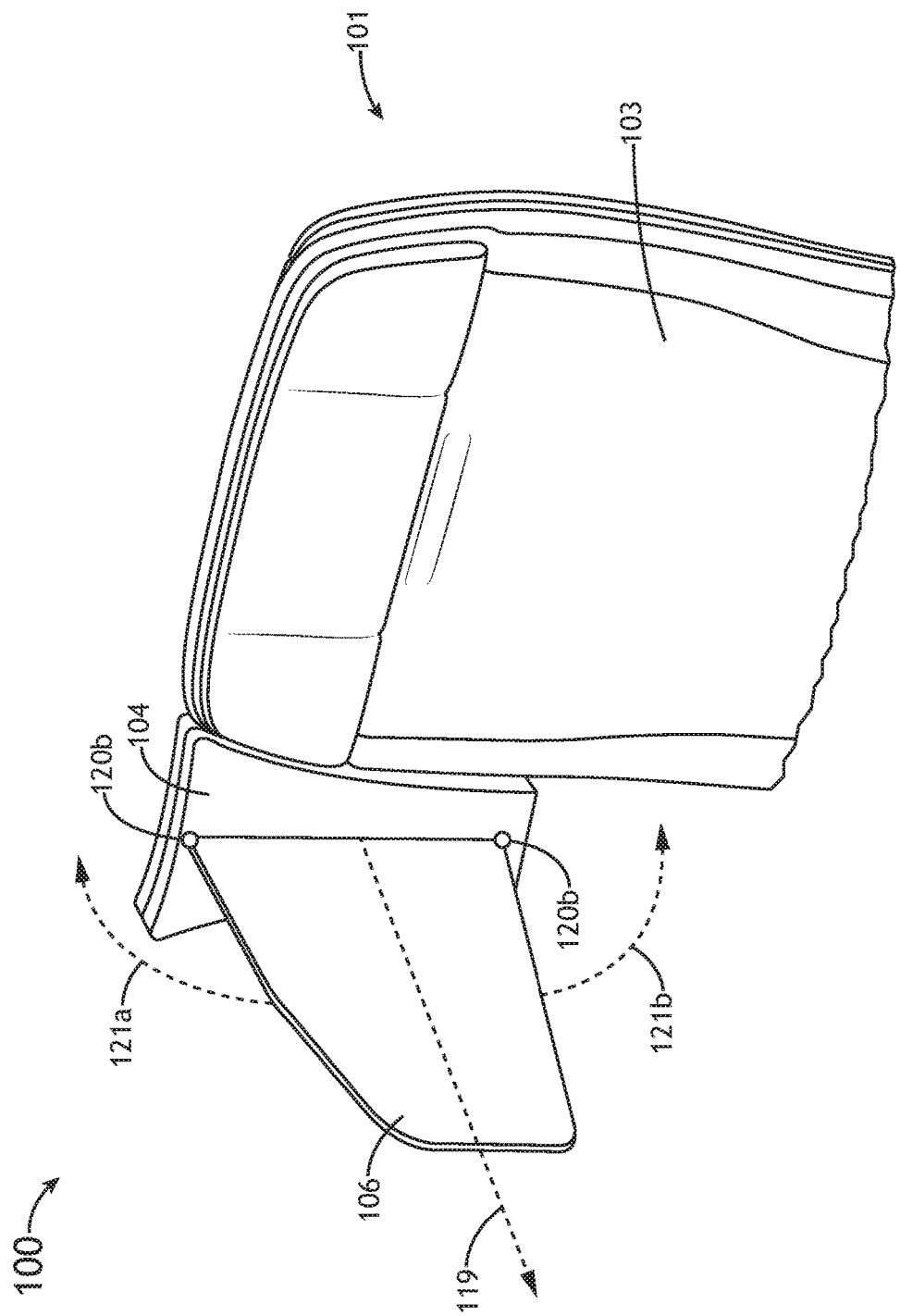
FIG. 3 illustrates a front perspective view of an aircraft passenger seat assembly, in accordance with one or more embodiments of the present disclosure.

FIG. 3 illustrates a front perspective view of an aircraft passenger seat assembly 100, in accordance with one or more embodiments of the present disclosure.

As noted previously herein, the one or more privacy panels 106 may be coupled to the closeout body 104 such that the one or more privacy panels 106 extend from the closeout body 104 proximate to the front seatback surface of the seatback 103. In this regard, the privacy panel 106 may be configured to at least partially separate a seating environment of an aircraft passenger seat 101 from an adjacent seating environment of an adjacent second aircraft passenger seat 101b.

It is noted herein that all passengers (e.g., a husband and wife) may not desire to have physical separation between adjacent seating environments. In order to account for differing privacy preferences between passengers, the privacy panel 106 may be removable in some embodiments. Accordingly, in some embodiments, the privacy panel 106 may be removably coupled to the closeout body 104. The privacy panel 106 may be removably coupled to the closeout body 104 via any coupling mechanism or assembly known in the art including, but not limited to, a tongue-and-groove interlocking assembly, a tab-and-slot interlocking assembly, and the like. For instance, the privacy panel 106 may include one or more projections (e.g., tongues, tabs) which are configured to be inserted within one or more recesses (e.g., grooves, slots) of the closeout body 104 in order to couple the privacy panel 106 to the closeout body 104.

In embodiments, the privacy panel 106 may be movable in order to provide improved privacy options and flexibility for passengers. For example, in some embodiments, the privacy panel 106 may include a retractable privacy panel 106, wherein the privacy panel 106 is configured to extend and retract along at least one movement axis. For instance, the privacy panel 106 may include one or more segments which are slidingly coupled to one another such that the privacy panel may extend and retract along a movement axis 119, as shown in FIG. 3. By way of another example, the privacy panel 106 may include an accordion-style privacy panel configured to fold along one or more creases in order to enable the privacy panel 106 to extend and retract along a movement axis 119. In embodiments, the retractable privacy panel 106 may be configured to retract from an active state to an inactive state, and extend from an inactive state to an active state.

By way of another example, the privacy panel 106 may be pivotably coupled to the closeout body 104 such that the privacy panel 106 may be pivoted or rotated according to a passenger's privacy preferences. The privacy panel 106 may be pivotably coupled to the closeout body 104 using any techniques or structured known in the art including, but not limited to, hinges. For instance, as shown in FIG. 3, the privacy panel 106 may be pivotably coupled to the closeout body 104 at hinge 120a, wherein the privacy panel 106 may be rotated/actuated about the hinge 120a along a clockwise rotation arc 121a. By way of another example, the privacy panel 106 may be pivotably coupled to the closeout body 104 at hinge 120b, wherein the privacy panel 106 may be rotated/actuated about the hinge 120b along a counterclockwise rotation arc 121b.

Figure 4A:
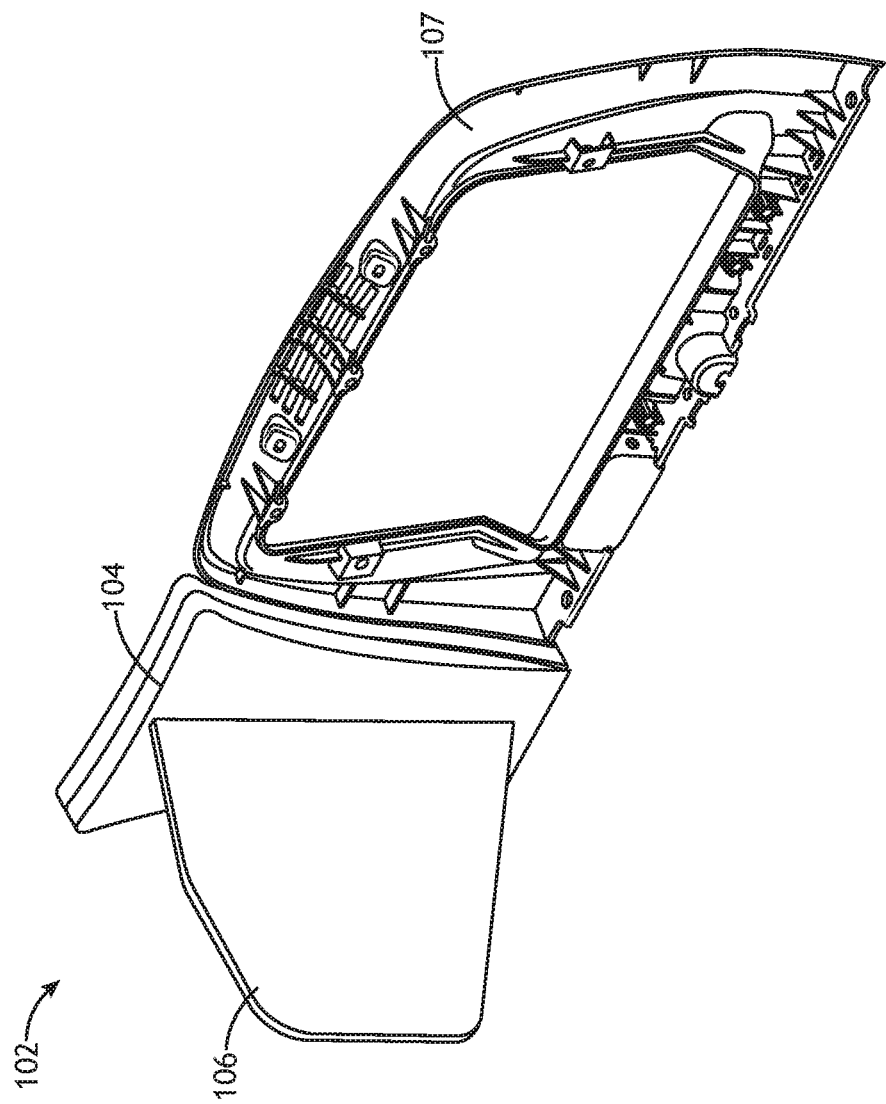
FIG. 4A illustrates a front perspective view of an aircraft passenger seat assembly, in accordance with one or more embodiments of the present disclosure.
Figure 4B:
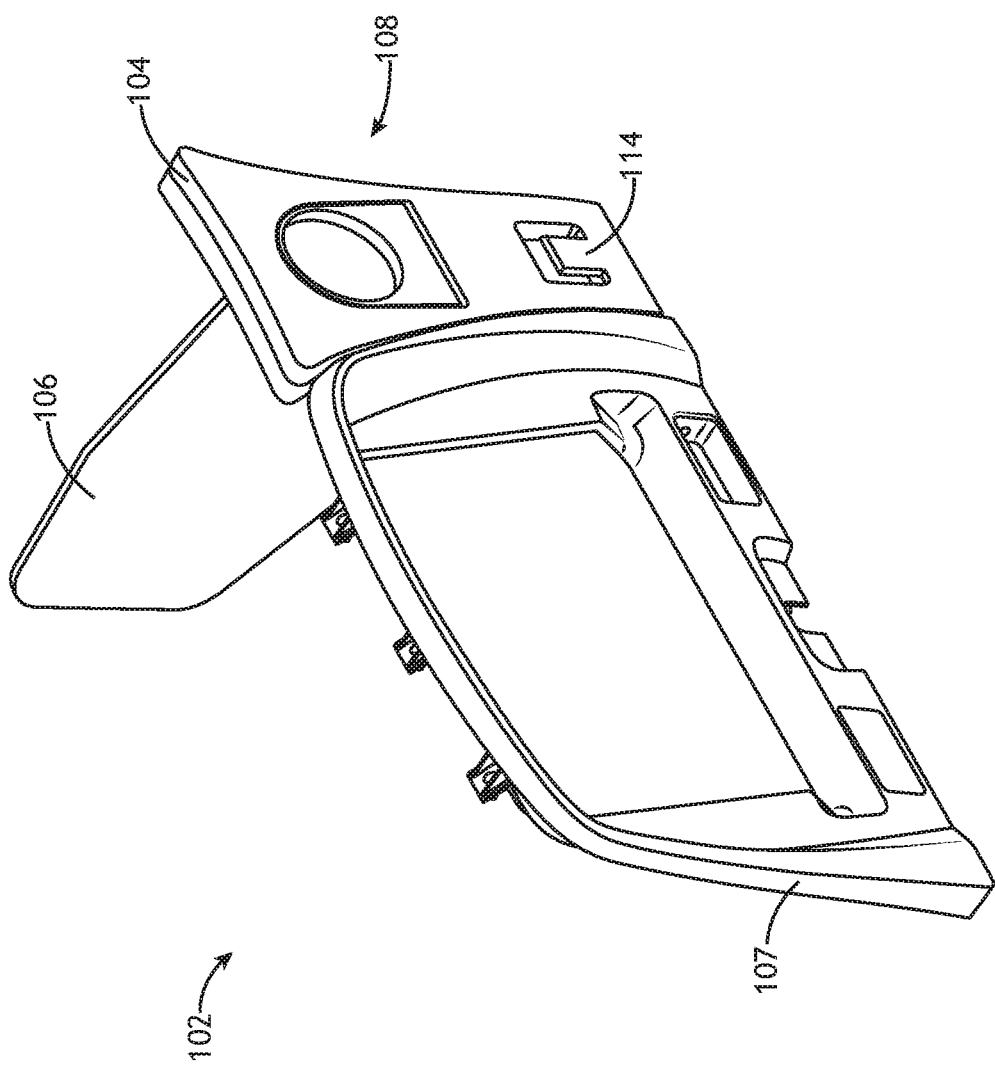
FIG. 4B illustrates a front perspective view of an aircraft passenger seat assembly, in accordance with one or more embodiments of the present disclosure.
Figure 4C:
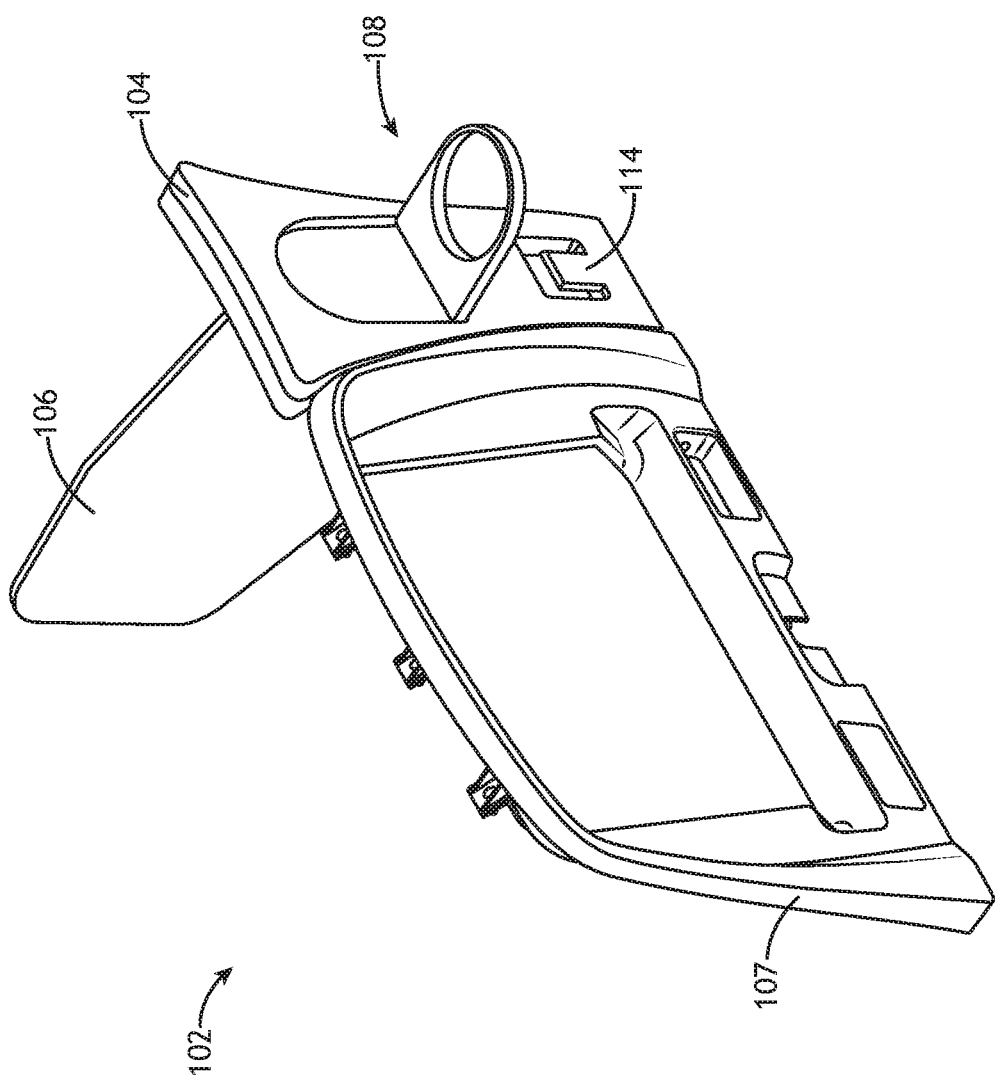
FIG. 4C illustrates a front perspective view of an aircraft passenger seat assembly, in accordance with one or more embodiments of the present disclosure.
Figure 4D:
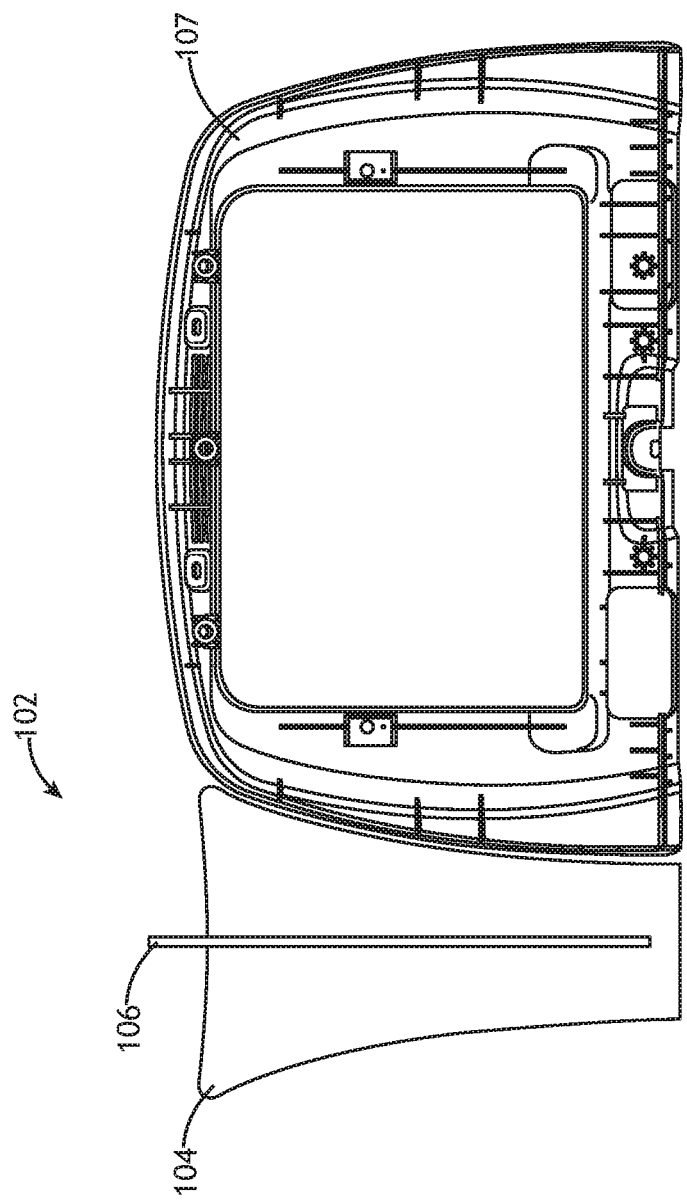
FIG. 4D illustrates a front elevation view of an aircraft passenger seat assembly, in accordance with one or more embodiments of the present disclosure.
Figure 4E:
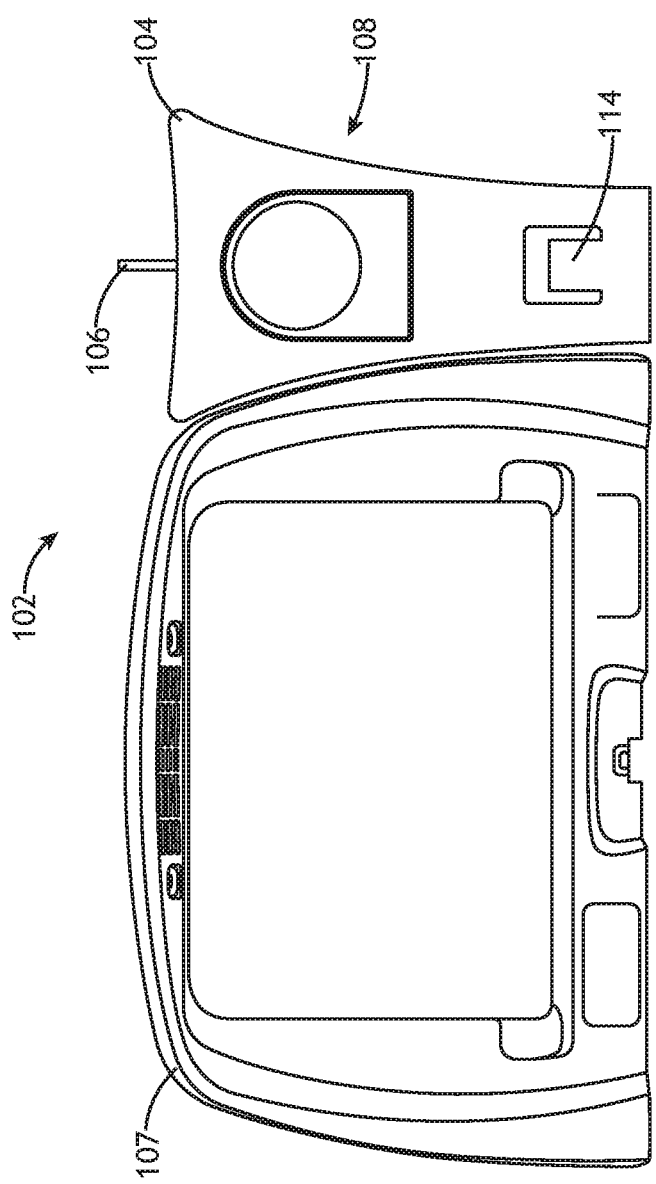
FIG. 4E illustrates a rear elevation view of an aircraft passenger seat assembly, in accordance with one or more embodiments of the present disclosure.
Figure 4F:
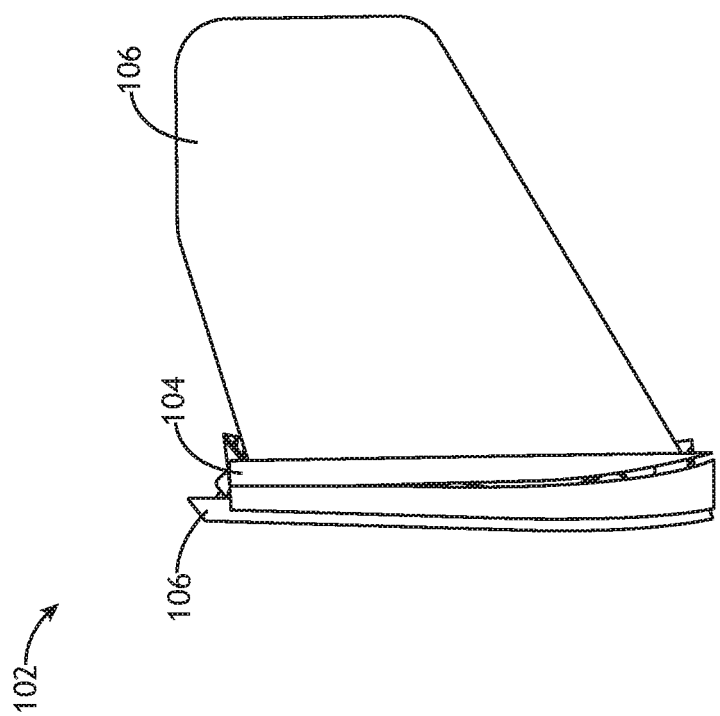
FIG. 4F illustrates a side elevation view of an aircraft passenger seat assembly, in accordance with one or more embodiments of the present disclosure.
Figure 4G:
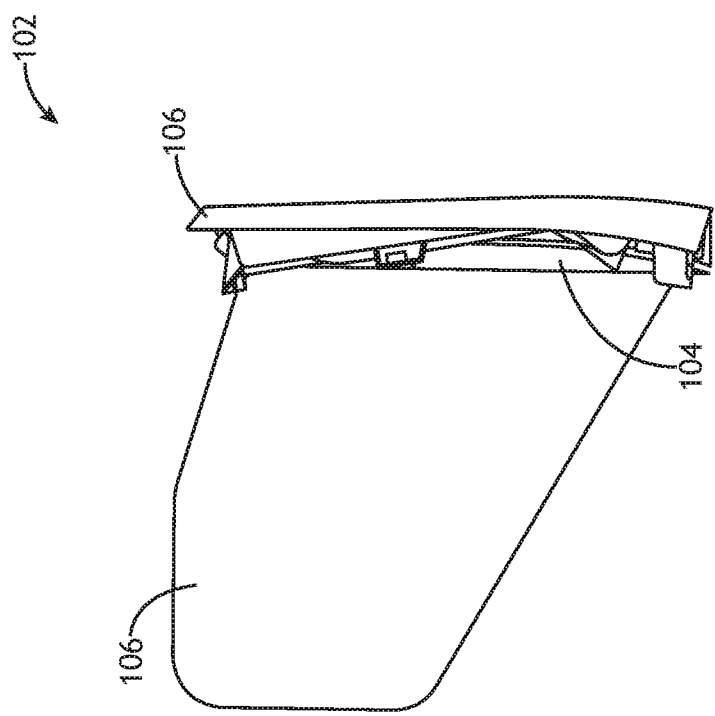
FIG. 4G illustrates a side elevation view of an aircraft passenger seat assembly, in accordance with one or more embodiments of the present disclosure.
Figure 4H:
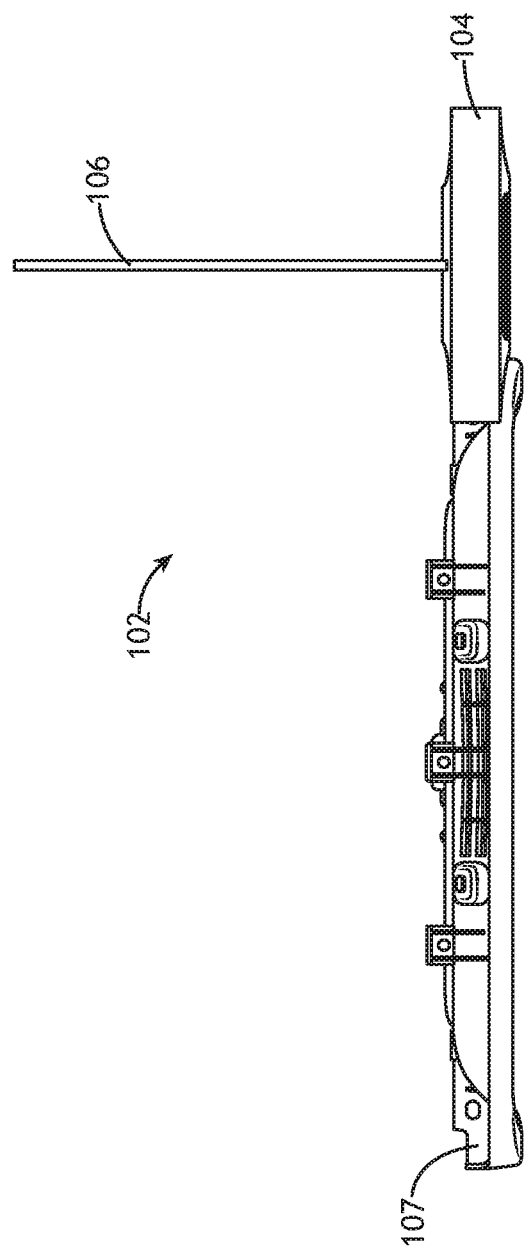
FIG. 4H illustrates a top elevation view of an aircraft passenger seat assembly, in accordance with one or more embodiments of the present disclosure.
Figure 4I:
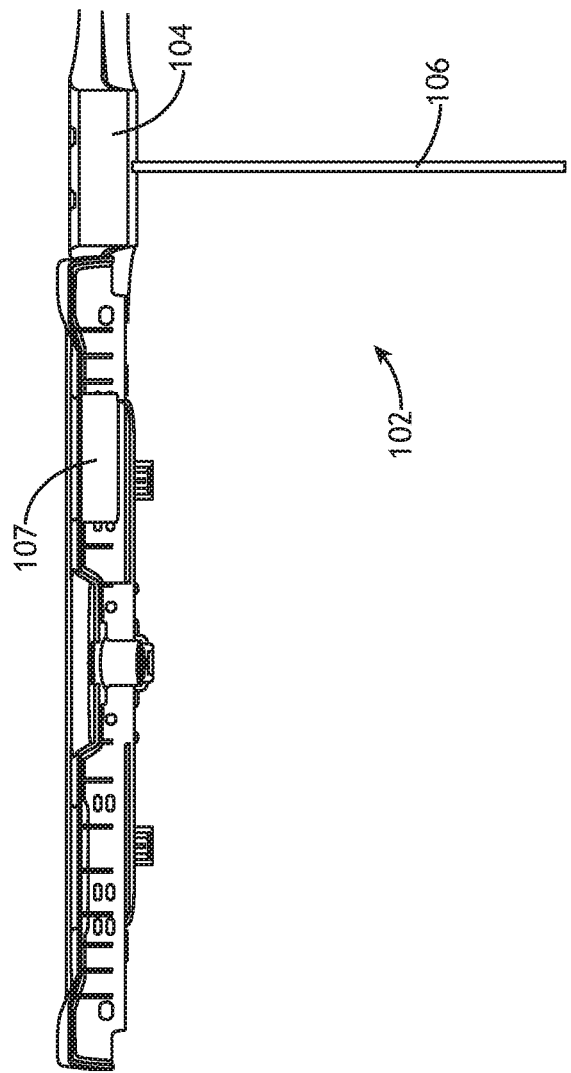
FIG. 4I illustrates a bottom elevation view of an aircraft passenger seat assembly, in accordance with one or more embodiments of the present disclosure.

FIG. 4A illustrates a front perspective view of an aircraft passenger seat assembly 100, in accordance with one or more embodiments of the present disclosure. FIG. 4B illustrates a front perspective view of an aircraft passenger seat assembly 100, in accordance with one or more embodiments of the present disclosure. FIG. 4C illustrates a front perspective view of an aircraft passenger seat assembly 100, in accordance with one or more embodiments of the present disclosure. FIG. 4D illustrates a front elevation view of an aircraft passenger seat assembly 100, in accordance with one or more embodiments of the present disclosure. FIG. 4E illustrates a rear elevation view of an aircraft passenger seat assembly 100, in accordance with one or more embodiments of the present disclosure. FIG. 4F illustrates a side elevation view of an aircraft passenger seat assembly 100, in accordance with one or more embodiments of the present disclosure. FIG. 4G illustrates a side elevation view of an aircraft passenger seat assembly 100, in accordance with one or more embodiments of the present disclosure. FIG. 4H illustrates a top elevation view of an aircraft passenger seat assembly 100, in accordance with one or more embodiments of the present disclosure. FIG. 4I illustrates a bottom elevation view of an aircraft passenger seat assembly 100, in accordance with one or more embodiments of the present disclosure.

Although example embodiments of the present disclosure are shown and described in an aircraft environment, the inventive concepts of the present disclosure may be configured to operate in alternative and/or additional contexts, unless noted otherwise herein. In this regard, the aircraft passenger seat assembly 100 may instead may be installed and/or configured or dimensioned to fit on any seat of any type of vehicle known in the art that has seats which are positioned in front of one another. For example, the aircraft passenger seat assembly 100 (more generally "seat assembly 100") may be implemented into the seats of any air, land, or water-based personal equipment or vehicle; any air, land, or water-based commercial equipment or vehicle (e.g., busses, trains, subways); any air, land, or water-based military equipment or vehicle known in the art. Additionally, it is noted herein the seat apparatus 100 of the present disclosure may be installed and/or configured or dimensioned to fit on any seat within a home or a business. For example, the seat assembly 100 may be installed and/or configured or dimensioned to fit on a seat in auditoriums, movie theatres, sports venues (e.g., baseball parks, arenas, or other venues having installed seats, or the like), where the seats are arranged in front of one other. Therefore, the above description should not be interpreted as a limitation on the disclosure but merely an illustration.

It is further noted herein that, where the environment includes an aircraft environment, it is noted herein the embodiments of aircraft passenger seat apparatus 100 may be configured in accordance with avionics guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:
1. An aircraft passenger seat assembly, comprising:
an aircraft passenger seat comprising:
a seatback configured to support an upper body of an aircraft passenger;
a seatback bezel defining at least a portion of a rear seatback surface; and
at least one privacy assembly, the at least one privacy assembly comprising:
a closeout body coupled to the seatback bezel; and
a privacy panel coupled to the closeout body, the privacy panel extending from the closeout body in order to at least partially separate a seating environment of the aircraft passenger seat from an adjacent seating environment of an adjacent aircraft passenger seat, wherein the privacy panel is removably coupled to the closeout body.
2. The aircraft passenger seat assembly of claim 1, wherein the closeout body is configured to substantially fill a gap between the seatback bezel of the aircraft passenger seat and an adjacent seatback bezel of an adjacent aircraft passenger seat.

3. The aircraft passenger seat assembly of claim 2, wherein the closeout body includes a first contoured edge conforming to a lateral surface of the seatback bezel of the aircraft passenger seat, and a second contoured edge conforming to a lateral surface of the adjacent seatback bezel of the adjacent aircraft passenger seat.

4. The aircraft passenger seat assembly of claim 1, wherein the seatback bezel and the closeout body are fabricated as a single seatback bezel assembly.

5. The aircraft passenger seat assembly of claim 1, wherein the closeout body is coupled to the seatback bezel by at least one of a mechanical fastener or a solvent bonding.

6. The aircraft passenger seat assembly of claim 1, wherein the closeout body is formed by at least one of a thermoforming process or an injection molding process.

7. The aircraft passenger seat assembly of claim 1, wherein the privacy panel comprises a retractable privacy panel configured to extend and retract along at least one movement axis.

8. The aircraft passenger seat assembly of claim 1, wherein the closeout body includes a rear closeout body surface proximate to the rear seatback surface.

9. The aircraft passenger seat assembly of claim 8, wherein the rear closeout body surface includes one or more cupholder assemblies disposed on the rear closeout body surface.

10. The aircraft passenger seat assembly of claim 9, wherein the one or more cupholder assemblies include a support structure pivotably coupled to the rear closeout body surface.

11. The aircraft passenger seat assembly of claim 8, wherein the rear closeout body surface includes one or more storage structures.

12. The aircraft passenger seat assembly of claim 11, wherein the one or more storage structures include at least one of a hook, a clip, a bracket, or a mobile device stowage assembly.

13. An aircraft passenger seat assembly, comprising:
an aircraft passenger seat comprising:
a seatback configured to support an upper body of an aircraft passenger;
a seatback bezel defining at least a portion of a rear seatback surface; and
at least one privacy assembly, the at least one privacy assembly comprising:
a closeout body coupled to the seatback bezel; and
a privacy panel coupled to the closeout body, the privacy panel extending from the closeout body in order to at least partially separate a seating environment of the aircraft passenger seat from an adjacent seating environment of an adjacent aircraft passenger seat, wherein the closeout body includes a rear closeout body surface proximate to the rear seatback surface, the rear closeout body surface includes one or more cupholder assemblies disposed on the rear closeout body surface.

14. The aircraft passenger seat assembly of claim 13, wherein the closeout body is configured to substantially fill a gap between the seatback bezel of the aircraft passenger seat and an adjacent seatback bezel of an adjacent aircraft passenger seat.

15. The aircraft passenger seat assembly of claim 14, wherein the closeout body includes a first contoured edge conforming to a lateral surface of the seatback bezel of the aircraft passenger seat, and a second contoured edge conforming to a lateral surface of the adjacent seatback bezel of the adjacent aircraft passenger seat.

16. The aircraft passenger seat assembly of claim 13, wherein the one or more cupholder assemblies include a support structure pivotably coupled to the rear closeout body surface.

17. An aircraft passenger seat assembly, comprising:
an aircraft passenger seat comprising:
a seatback configured to support an upper body of an aircraft passenger;
a seatback bezel defining at least a portion of a rear seatback surface; and
at least one privacy assembly, the at least one privacy assembly comprising:
a closeout body coupled to the seatback bezel; and
a privacy panel coupled to the closeout body, the privacy panel extending from the closeout body in order to at least partially separate a seating environment of the aircraft passenger seat from an adjacent seating environment of an adjacent aircraft passenger seat, wherein the closeout body includes a rear closeout body surface proximate to the rear seatback surface, the rear closeout body surface includes one or more storage structures.

18. The aircraft passenger seat assembly of claim 17, wherein the closeout body is configured to substantially fill a gap between the seatback bezel of the aircraft passenger seat and an adjacent seatback bezel of an adjacent aircraft passenger seat.

19. The aircraft passenger seat assembly of claim 17, wherein the one or more storage structures include at least one of a hook, a clip, a bracket, or a mobile device stowage assembly.

* * * * *